Oct. 31, 1967  H. L. CLARY ET AL  3,350,005
TEN KEY PRINTING CALCULATING MACHINE
Filed Dec. 16, 1966  5 Sheets-Sheet 3

INVENTORS
HUGH L. CLARY
BY FRED N. SCHWEND

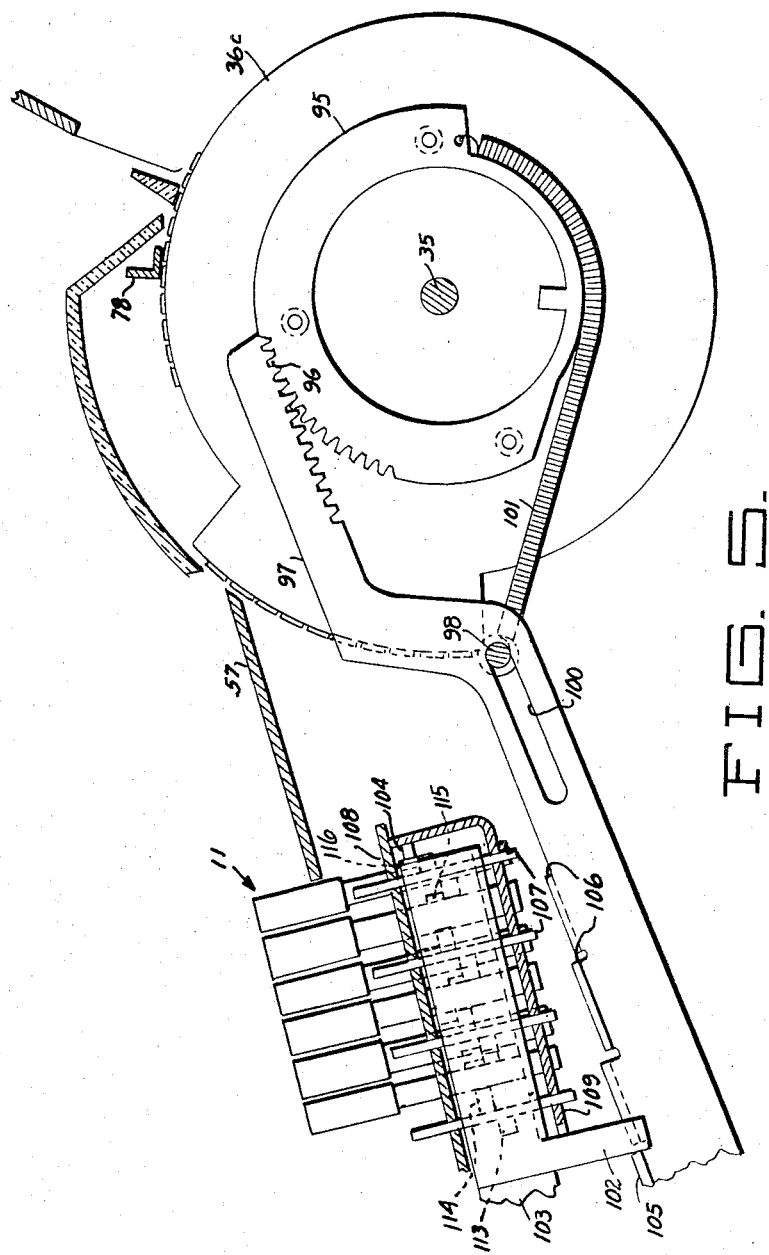

Oct. 31, 1967 H. L. CLARY ET AL 3,350,005
TEN KEY PRINTING CALCULATING MACHINE
Filed Dec. 16, 1966
5 Sheets-Sheet 5
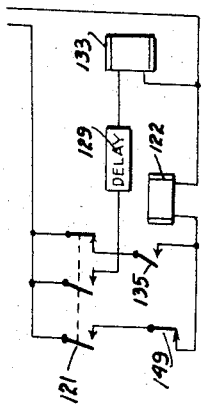
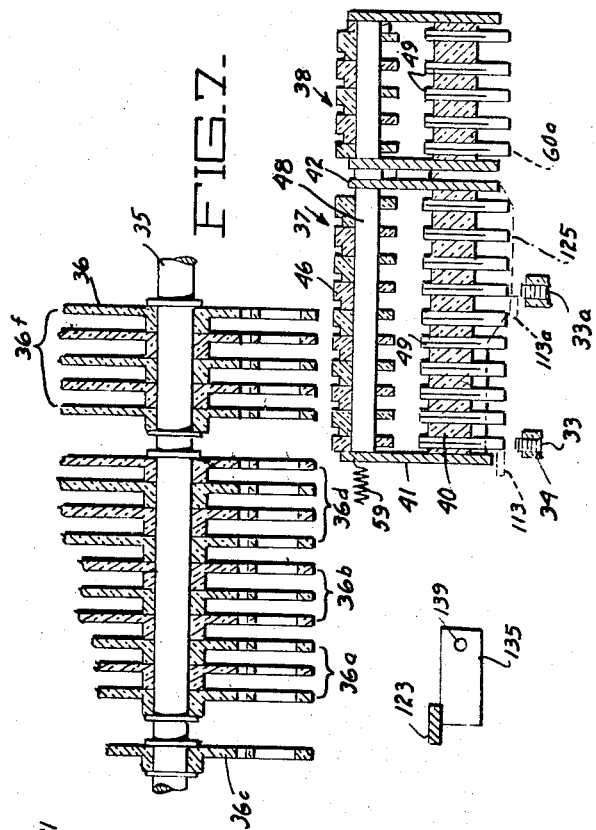
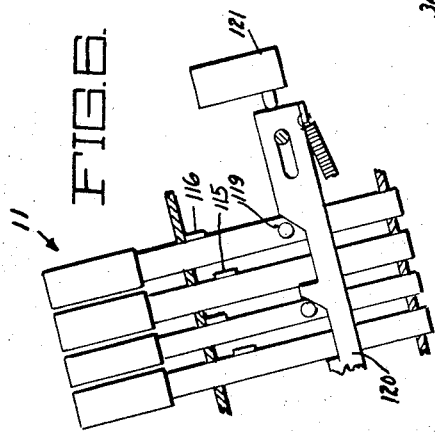
INVENTORS
HUGH L. CLARY
BY FRED N. SCHWEND United States Patent Office 3,350,005
Patented Oct. 31, 1967

3,350,005
TEN KEY PRINTING CALCULATING MACHINE
Hugh L. Clary, San Marino, and Fred N. Schwend, Arcadia, Calif., assignors to Clary Corporation, San Gabriel, Calif., a corporation of California
Filed Dec. 16, 1966, Ser. No. 608,716
11 Claims. (Cl. 235—60)

ABSTRACT OF THE DISCLOSURE

This invention relates to printing calculating machines and has particular reference to point-of-sale registering machines embodying ten key keyboards and adjacent intermediate pin carriages or the like for entering factors of a calculation.

Background of the invention

In point-of-sale registering machines, such as that disclosed and claimed in the Scozzafava et al. Patent No. 3,017,081, issued on Jan. 16, 1962, various amounts and identification data pertaining to a sales transaction are entered into the machine through appropriate keys of the keyboard and are printed in a prescribed format on a form which becomes a receipt for the customer. A carbon copy may be retained for record purposes by the store or seller. Information recorded on the form is preferably also transmitted to a punched or magnetic tape recorder or the like for recording in machine readable form data useful for inventory, tax, payroll and other accounting purposes.

Machines of the above nature have heretofore generally been of the full key keyboard type. However, such full keyboard machines are relatively complicated due to the relatively large number of functions which they have to perform and due to the particular format of printing which is usually required.

Summary of the invention

A principal object of the present invention is to provide a point-of-sale or similar registering machine having a much simpler construction and fewer parts than those produced heretofore, without sacrificing the functions and convenient printing formats of such prior machines.

The invention basically comprises a ten key type machine in which many of the parts perform multiple functions. For example, a series of rockable sectors are provided which are differentially settable to register different amounts entered into the machine and which directly cause printing, digitation of an accumulator and control of remotely located recording devices.

A pair of adjacent pin carriages are provided which are cooperable with denominationally arranged differentially movable stop slides which control the positioning of the sectors. Each of the pin carriages has a plurality of denominationally arranged columns of settable pins effective to arrest aligned ones of the slides. Individual escapement means are provided for each of the carriages and means are provided for automatically controlling at least one of the carriages to obviate intereference with the other and to permit printing of items entered through such pin carriages in adjacent columns on the receipt form.

Brief description of the drawings

FIG. 5 is a longitudinal sectional view illustrating the controls for entering the "type of transaction" and tax codes.

FIG. 6 is a sectional view illustrating certain of the keys and associated mechanism for causing escapement of one of the pin carriages upon depressing certain of the code keys.

FIG. 7 is a sectional plan view taken substantially along the line 7—7 of FIG. 2.

FIG. 8 is a schematic wiring diagram of part of the control circuit.

Description of the preferred embodiment

Figure 1:
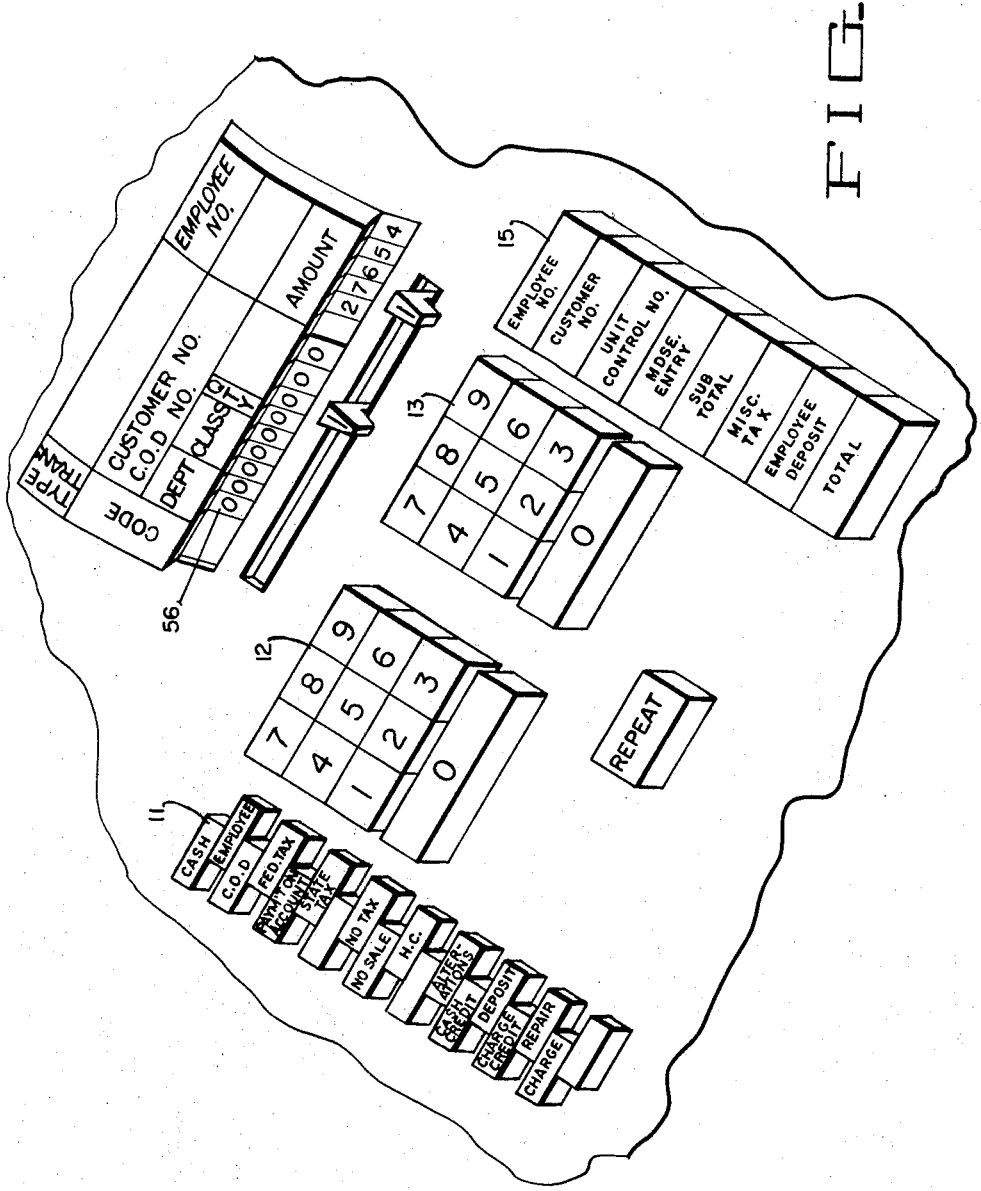
FIG. 1 is a perspective view illustrating one form of keyboard of a point-of-sale machine embodying the present invention.

The sales registering machine disclosed herein embodies mechanism which is basically similar to that found in the well-known Addmaster Adding Machine and reference is hereby made to the R. E. Busch Patent No. 3,113,719, issued on Dec. 10, 1963, and the H. L. Clary et al. Patent No. 3,132,582, issued on May 12, 1964, for details of the basic Addmaster Adding Machine not disclosed herein. Accordingly, for the sake of brevity, only those portions of such mechanism which relate to or form part of the present machine and which are not disclosed in those patents will be described in detail herein.

The machine includes a lefthand row of keys 11 for entering a code representing the type of transaction, type of tax, etc.; a lefthand ten key keyboard 12 for entering the customer's number, the department in which items are purchased, class of items, quantity of items sold, etc.; a righthand ten key keyboard 13 for entering the employee's number and amounts of items, taxes, etc.; and a righthand row of keys 15 for controlling the machine in accordance with the type of operation to be performed, such as merchandise entry, sub-total, tax entry, total, etc.

Describing first the general operation of the machine in registering a sales transaction, it will be noted that a series of connected forms, one of which is shown at 16 (FIG. 3), having preprinted lines and column and row headings is fed past a printer generally indicated at 17 (FIG. 2) to imprint in adajcent columns the various items of information necessary to form a complete record of the transaction. Such information is also transferred to a suitable data recorder (not shown), such as a coded tape punch, which makes a machine-readable record of the transaction. A suitable tape punch for this purpose is disclosed in the M.V. Scozzafava et al. Patent No. 3,017,081, issued on Jan. 16, 1962.

Two basically different types of transactions are generally encountered. One of these is a "charge" transaction and is represented by the code "2" which is entered by depressing a "Charge" key in the lefthand section of row 11 and is printed at 18 in a row designated A on the form 16. The other basic type of transaction is a "cash" transaction represented by the code "9" and is entered by depression of the "Cash" key in the lefthand section of row 11. Other types of transactions are identified by depressing appropriate keys in the left hand section of the row 11 whereby the code representing such type of transaction will likewise be printed at 18.

Figure 4:
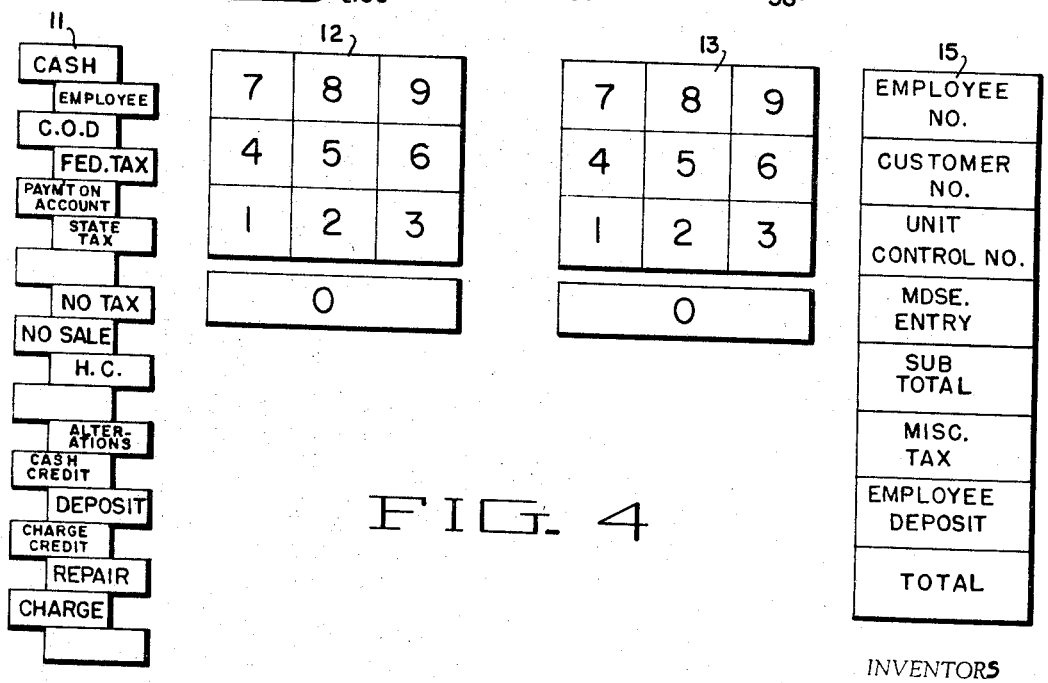
FIG. 4 is a schematic plan view illustrating the relationship between the keyboard, pin carriage and differential actuating sectors.

The employee's or cashiers' serial number is entered in the righthand ten key keyboard 13 and is printed at 20 in the first row A of the form. The register number is printed at 21, indicating the serial number of the particular machine used to register the transaction, and the transaction number is printed at 22 in row A. These items are obtained from a register diagrammatically indicated at 23 (FIG. 4) and a consecutive counter register 24, respectively.

Operation of the machine to print the items in row A is effected by depressing the "Employee No." key in column 15, causing a cycle of operation of the machine.

In the case of a "charge" transaction, entry of the customer identification number is made in the second row B of the form 16. Such number is entered in the lefthand keyobard 12 and, upon depressing the "Customer No." key in the row 15, the machine is operated to print this number.

The identification and amount of different items forming a sales transaction are printed in successive rows of the form starting with row C. Here, the department in which the goods is found, the class of goods and the quantity are entered in sequence in the lefthand keyboard 12 and the amount is entered in the righthand keyboard 13. The "Mdse Entry" key in row 15 is depressed following entry of the data for each item sold to cause the machine to cycle and to print this data.

Following entry of all of the items involved in the transaction, a "Subtotal" key in row 15 is depressed, causing the machine to print a subtotal in row D so that the taxes and other appropriate data may be computed and subsequently entered.

The type of taxes or other information is entered in code by depressing an appropriate key in the righthand section of row 11 and the amount of such taxes is entered in the keyboard 13. The "Miscellaneous Tax" key in row 15 is then depressed, causing the code to be printed at 25 in the same column on the form 16 as the type of transaction code 18 is printed, and the amount of the tax, etc. is printed at 26.

Subsequently, the "Total" key in row 15 is depressed, causing the machine to print a total on the form at 27.

Keyboards

As disclosed in detail in the above Busch and Clary patents, each of the ten key keyboards 12 and 13 comprises ten amount keys 30 which are mounted in keystems 31 (FIG. 2) slideable vertically in slots provided in upper and lower key frames 32 and 33, respectively, forming part of the framework of the machine. Each keystem is attached to the upper end of a respective flexible cable 33. The various cables are vertically aligned with each other and are slideably mounted for endwise movement in curved grooves formed in a guide block 34 suitably fixed to the machine framework. The various cables 33 terminate in an arcuate pattern concentric with a shaft 35 which rotatably and independently supports a series of sectors 36.

Pin carriages

Two pin carriages generally indicated at 37 and 38 (FIGS. 4 and 7) are provided to receive entries from the two keyboards 12 and 13, respectively.

Two pin carriages each comprise an arcuate body 40 of plastic or other material mounted within an enclosing frame comprising side members 41 and 42. The latter members of each pin carriage are slideable on transversely extending stationary rods 43 and 44 for either conjoint or independent movement into cooperative relation with different ones of the sectors 36. Springs, one of which is shown at 59, independently urge the pin carriages to the left in FIG. 7. However, when the pin carriages are in their initial righthand positions shown in FIG. 7, the righthand pin carriage 38 presses against the pin carriage 37 and will follow the latter until arrested in a manner described later.

Figure 2:
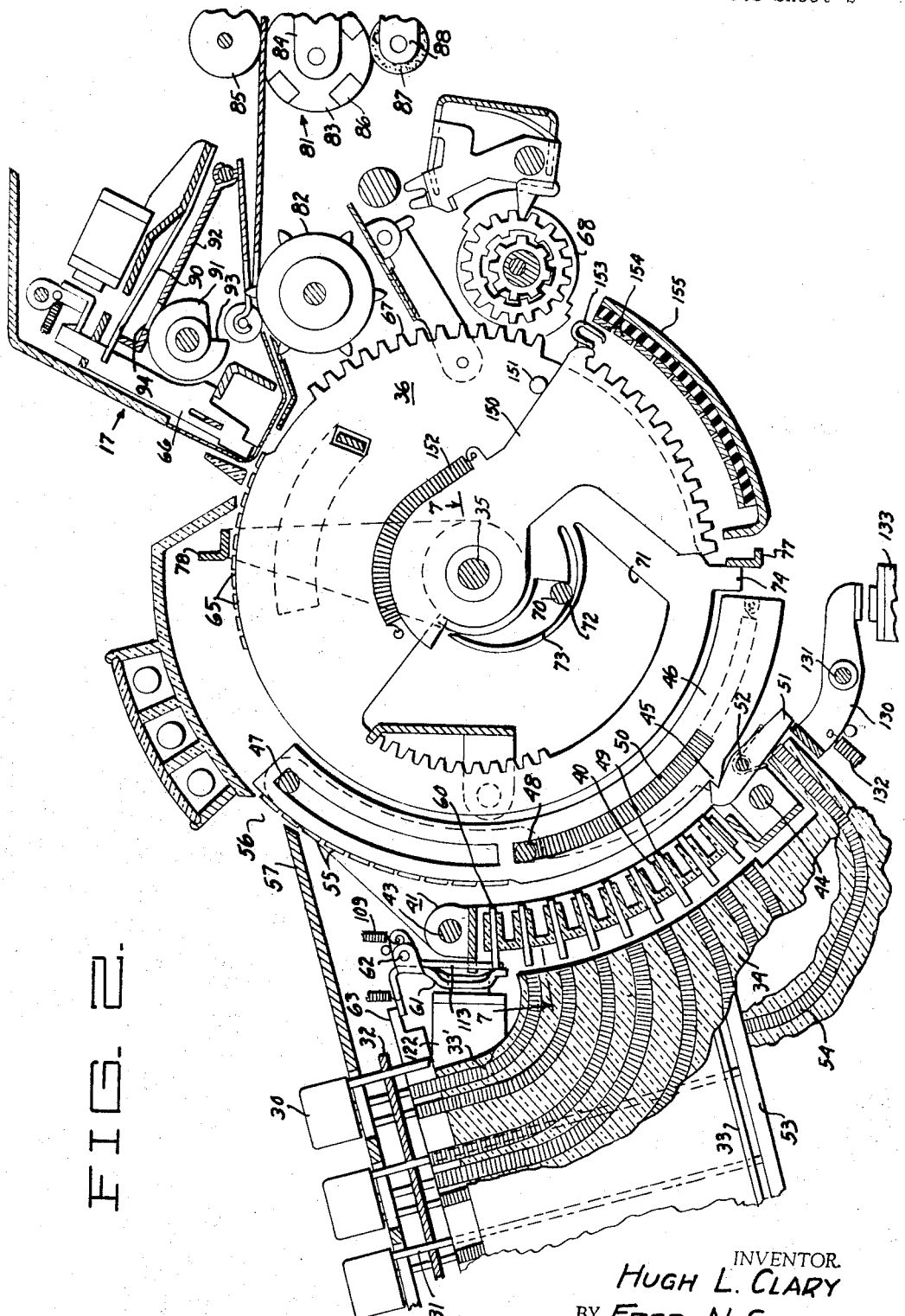
FIG. 2 is a longitudinal sectional view, with parts broken away, of the point-of-sale machine.
Figure 3:
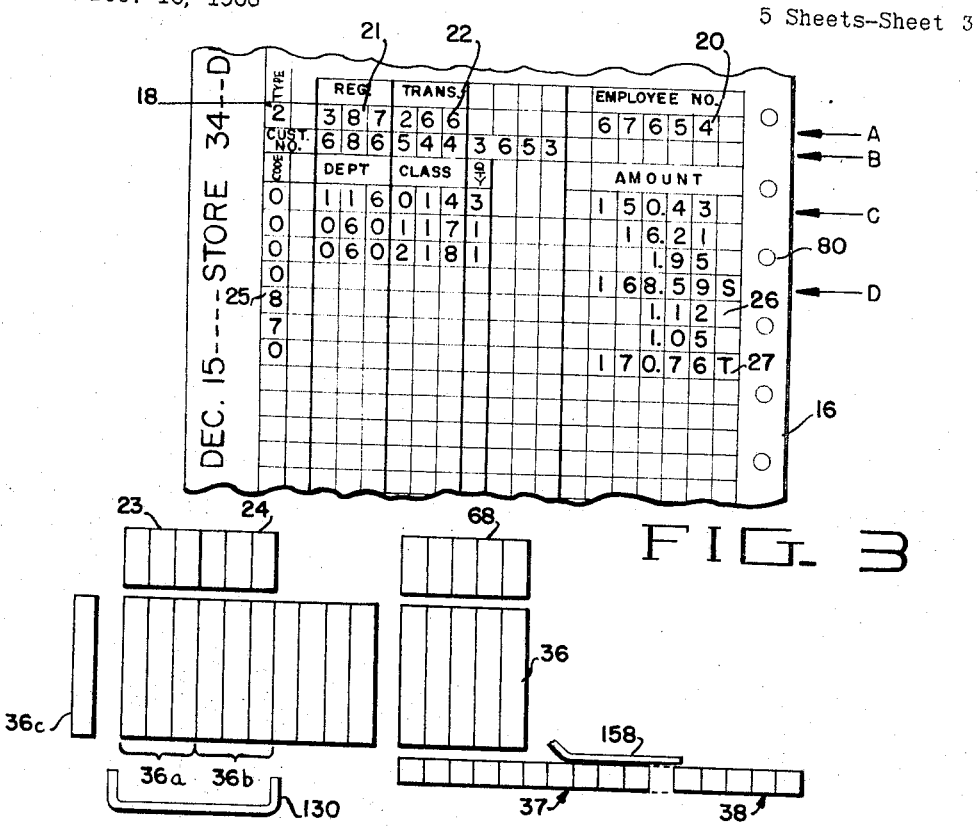
FIG. 3 is a facsimile of one form of sales check produced by the machine.

Each pin carriage supports a series of cloumns and rows of stop pins 49 which are slideably mounted therein for endwise movement from positions shown in FIG. 2 to positions wherein they are located in the paths of stop shoulders 45 formed on aligned arcuate stop slides 46. The latter are provided with arcuate guide slots slideable over guide rods 47 and 48 which are supported by the respective pin carriage side members 41 and 42. Each slide is urged counterclockwise from its illustrated position by a tension spring 50 extending between the slide and the guide rod 48 but is normally latched against such movement by a latch 51 pivotally supported at 52 by the respective pin carriage.

Upon depression of any amount key 30 and consequent setting of a corresponding stop pin 49, its keystem depresses a bail member 53 which is effective to actuate an additional flexible cable 54 also guided within a groove formed in the guide block 34. The cable 54 when actuated rocks the aligned latch 51 to release the aligned slide 46, permitting it to move upward in a path concentric with the shaft 35 until its shoulder 45 strikes the set stop pin.

Each slide 46 carries a series of indicia 55 ranging in value from 0 to 9. Such indicia are visible through a window opening 56 formed in a cover member 57 of the machine so that an amount entered into the keyboards 12 and 13 and set up on the various slides 46 may be readily checked prior to operation of the machine.

Each pin carriage includes an additional horizontal row of escapement pins 60 similar to the various stop pins 49 but located thereabove. Such escapement pins are adapted to be engaged by one of a pair of laterally spaced bails 61 associated with respective ones of the keyboards 12 and 13 and independently pivoted at 62. Each bail 61 is engaged by a second bail 63 which underlies extensions of the keystems of the various keys in the associated keyboard so that depression of any key rocks the bails 63 and 61 to depress whichever escapement pin is aligned with the bail 61.

The leftmost escapement pin 60 of the pin carriage 37 normally limits against a stop member 113 also pivoted at 62 and normally held in blocking position by a spring 109. Thus, upon depression of any amount key in keyboard 12 to set an appropriate stop pin 49 in that carriage so as to position a slide 46, an aligned escapement pin 60 will be depressed permitting the pin carriage 37 to escape one column to the left wherein the next escapement pin 60 will arrest against the stop member 113. During such movement of the carriage 37 the second pin carriage 38 will follow until the leftmost escapement pin 60a thereon limits against a second stop member 113a similar to member 113.

The escapement pins 60a of carriage 38 are released by depression of the amount keys in keyboard 13 in the same manner as are the pins 60. The stop member 113a is pivotally supported in a manner similar to stop member 113 but is normally held out of blocking relation with the escapement pins 60 of the pin carriage 37 by a cam formation 125 carried by the latter pin carriage.

Sectors and drive therefor

The various differentially actuatable sectors 36 are independently mounted on the shaft 35 and each has a series of type characters 65 thereon ranging in value from 0 to 9 and cooperable with the printing mechanism 17 to imprint a selected character on the portion of a form 16 located under the print hammers 66 which form part of the printing mechanism.

The sectors 36 also have gear teeth 67 adapted to be meshed with an accumulator 68 or an aligned register 23 or counter register 24.

The various sectors 36 are yieldably driven clockwise from their home positions illustrated in FIG. 2 during digitizing and totalling operations by a bail rod 70. The latter is swung in a clockwise and then counter clockwise movement about the shaft 35 by suitable means shown in the above Busch and Clary patents during each cycle of the machine initiated by depression of any of the control keys in the row 15.

The bail rod 70 extends through openings 71 in the sectors and is normally engaged by a detent shoulder 72 formed on a yieldable tail 73 extending integral with each sector. As the bail rod is rocked clockwise from its home position it will correspondingly rock the sectors 36 until shoulders 74 thereon engage aligned slides 46 which have been previously set in different angular positions or until they are arrested by the accumulator during totalling and subtotalling operations, whereupon the detenting shoulders 72 on the tails 73 will yield, permitting the bail rod to proceed to the limit of its excursion.

In order to transfer data from the sectors 36 to the aforementioned data recorder a brush arm 150 is pivotally supported adjacent each sector for movement about the shaft 35. The arm is normally held against a pin 151 on the associated sector by a spring 152 tensioned between the arm and the sector. An electrical contact brush 153 is carried by the arm 150 and is adapted to complete a circuit through one of a series of ten bus conductors 154 extending across the machine, depending on the position to which the sector is advanced. The conductors 154 are connected to the data recorder in a manner similar to the connections of conductors 414 of the aforesaid Scozzafava et al., patent. The conductors 154 are carried by an arcuate plate 155 which is moved upwardly to contact one of the conductors 154 with the brushes 153 just prior to the printing phase of the machine cycle.

After the printing phase of a machine cycle, the bail rod 70 is returned and in doing so it will return the various sectors 36 to their home positions where they will arrest against a transverse bar 77.

The various slides 46 are returned to their illustrated latched positions by a restore bail 78 pivotally supported on the shaft 35 and actuated by a suitable cam (not shown) during the latter part of a machine cycle.

*Printer and form feed mechanism*

The strip of forms 16 is preferably formed of a paper capable of rendering visible the imprint of type characters impressed thereon. The paper is provided with feed sprocket perforations 80 along one side and is fed from a suitable source of supply (not shown) past a rotary store and date printer, generally indicated at 81 (FIG. 2) and over a feed sprocket 82.

The printer 81 comprises a rotary type wheel 83 pivotally supported by an arm 84 which is spring pressed upward to hold the strip against a roller 85. The type wheel has characters engraved thereon representing, for example, the store name. Also replaceable type segments 86 are mounted on the type wheel and carry type characters representing, for example, the date.

An inking roller 87 of felt or the like and impregnated with printing ink is rotatably supported by an arm 88 which is spring urged upwardly to cause a continuous transfer of ink from the roller 87 onto the type wheel from whence an imprint of the type characters is transferred to the form.

The printer 17 is similar to that disclosed in the above Busch and Clary et al. patents and comprises, in general, a series of spring fingers 90 which urge respective ones of the hammers 66 downwardly. Normally, however, the hammers are held in their upper illustrated positions by a cam 91 which underlies a cam follower 92 located under the various fingers 90.

During the printing phase of a machine cycle, a shoulder 93 on the cam 91 passes one edge of an opening 94 on the cam follower 92, permitting the fingers 90 to impel those hammers 66 which are otherwise allowed to do so, downwardly to effect an imprint of aligned type characters 65 onto the form. Immediately thereafter, the cam 91 is effective to retract the hammers to their normal positions.

*Accumulator*

The accumulator 68 and total stop mechanism therefor is disclosed and claimed in detail in the above Busch patent and therefore, for the sake of brevity, such details are not disclosed herein and reference may be had to said patent for a complete understanding of the accumulator. However, it should be noted that the accumulator cooperates only with the group of five rightmost sectors 36, as shown diagrammatically in FIG. 4.

*Type-of-transaction and tax code entering mechanism*

The type of transaction and type of tax code which is printed as at 18 and 25 on the form (FIG. 3) is entered into the machine by the mechanism shown particularly in FIG. 5, through the row of keys 11. Such mechanism comprises a single sector 36c (see also FIG. 4) which is spaced from the remaining sectors 36 and is attached to a ring 95 geared at 96 to a rack 97. The latter is guided for longitudinal movement by frame studs, one of which is shown at 98, embraced by guide slots 100 in the rack.

The sector 36c is urged clockwise by a tension spring 101 extending between the ring 96 and one of the frame studs 98 but is normally prevented from moving out of its illustrated home position by a zero latch 102 supported by a key latch bail 103 supported by pivots, one of which is shown at 104, and normally held in a position engaging an ear 105 on the rack 97 by a suitable spring (not shown).

The rack 97 has a series of spaced stop shoulders 106 formed therealong and adapted to limit against depressed ones of a series of spaced keystems 107 which are slideably mounted in guide slots formed in spaced key frame plates 108 and 109. Springs (not shown) normally hold the keystems 107 in their upper illustrated positions but upon depression of any keystem it will be effective to cam the latch 103 outwardly, releasing the zero latch 102 from the ear 105 of rack 97 to permit the spring 101 to advance the sector 36c clockwise until one of the stop shoulders 106 limits against the depressed keystem. The latch 103 also becomes effective to latch such keystem in depressed position.

Reference may be had to the R. E. Boyden Patent 2,495,832, issued on Jan. 31, 1950, for details of the above noted key latching mechanism.

Each keystem 107 has a pair of oppositely extending ears 113 and 114 thereon which underly ears, i.e. 115 and 116, extending from the stems of an adjacent pair of keys located in the right and lefthand sections, respectively, of the row 11. Such keys have their stems slideably mounted in slots formed in the key plates 108 and 109 and are yieldably held in their illustrated upper positions by suitable springs (not shown). Thus, for example, depression of the "Cash," type-of-transaction key or the directly adjacent "Employee" code entry key in row 11 is effective to depress the righthand keystem 107 in FIG. 5.

As noted hereinabove, during entry of information contained in Line A of the form 16, the employee serial number is entered in the keyboard 13, thereby actuating the righthand group of cables 33a (FIG. 7). In this case, it is necessary to enter such amounts by setting the stop pins 49 of the righthand pin carriage 38. Accordingly, each of the type-of-transaction keys in the lefthand section of row 11 is provided with a cam stud 119 effective to cam a control slide 120 to the right (FIG. 6) to actuate a three pole switch 121. The contacts of one pole of switch 121 are located in circuit with an electromagnet 122 cooperable with the escapement pin stop member 113 associated with the lefthand pin carriage. Therefore, when the switch is actuated the magnet 122 will withdraw the stop member 113 from blocking position, permitting the lefthand pin carriage 37 to be moved to the left by its spring 59 until arrested by a frame member 123 whereupon the slides 46 carried thereby are aligned with respective ones of the lefthand group of sectors 36, including sectors 36a, 36b and 36d. During this traverse of the pin carriage 37 to the left, the pin carriage 38 will follow until the leftmost escapement pin 60a thereon strikes its associated escapement pin stop member 113a which has been allowed to move into blocking position by the cam 125. Thereafter, as the employee number is entered into the keyboard 13, the righthand pin carriage 38 will escape to the left in the usual manner into cooperative relation with the righthand group of sectors 36f.

Also, as noted heretofore, means (not shown) are provided to subtotal the registers 23 and 24 to print the register number and transaction number during printing of the employee number. For this purpose, the slides 46 on the carriage 37 are released to move clockwise to the limits of their travels so as to not impede the differential movement of the aligned sectors under control of the registers 23 and 24. For this purpose, a bail 130 is located in alignment with the sectors 36a and 36b and is pivotally supported at 131. The bail is rocked clockwise against the action of a spring 132 by an electromagnet 133 located in circuit with the normally open contacts of a second pole of the switch 121 (FIGS. 6 and 8) and a suitable delay device 129. Thus, those latches 51 aligned with the sectors 36a and 36b when the pin carriage 37 is in its leftmost position will be concurrently released.

Toward the end of the machine cycle during which the employee number is entered, suitable means (not shown) rocks the latch 103 to release the depressed keystem 107.

Due to the possibly large number of charge customers which may be registered in certain stores or chains of stores, the machine is provided with the capability of printing relatively large customer serial numbers which, in this case, is illustrated in line B as having a maximum of ten denominational orders. On the other hand, the department, class and quantity data which are also entered in the lefthand pin carriage normally contain a lesser number of denominational orders and in this case they are illustrated as containing a total of seven denominational orders. Therefore, since it is desirable to align the leftmost significant digits of the customer's serial number with that of the department data, means are provided to automatically shift the lefthand pin carriage to its extreme lefthand position after the department, class and quantity data are entered. For this purpose, a normally open switch 135 (FIGS. 7 and 8) is located with a camming plunger 139 in the path of the pin carriage 37 and in a position adapted to be closed by the pin carriage when it has advanced through seven columns in entering the department, class and quantity data. Switch 135 is located in circuit with the electromagnet 122 and with normally closed contacts of a third pole of switch 121 so that when the department, etc., data has been entered, the stop member 113 will be removed to permit the pin carriage to escape to its leftmost position.

Means (not shown) are provided to open a normally closed switch 149 in circuit with the electromagnet 122 during entry of the customer's number on line B of the form.

Means (not shown) are also provided to return the lefthand pin carriage 37 and consequently also the righthand pin carriage to their rightmost positions indicated in FIG. 7 toward the end of each machine cycle. During such return movement, the pins 49 and 60 are returned to their undepressed positions by a stationary cam plate, shown diagrammatically at 158 in FIG. 4. In order to return all pins, the pin carriages are caused to overtravel to the right and then are returned to their illustrated positions by their springs, i.e., 59.

Although the invention has been described in detail and certain specific terms and languages have been used, it is to be understood that the present disclosure is illustrative rather than restrictive and that changes and modifications may be made without departing from the spirit or scope of the invention as set forth in the claims appended hereto.

What is claimed is:
1. In a calculating machine,
   the combination comprising a plurality of denominationally arranged elements differentially movable to different character representing positions,
   means for yieldably advancing said elements,
   a pair of aligned pin carriages cooperable with said elements,
   each of said carriages having a plurality of denominationally arranged columns of settable pins effective to arrest aligned ones of said elements in different character representing positions,
   yieldable means for advancing a first one of said carriages,
   first escapement means normally restraining said first carriage and operable as an incident to setting of a said pin in said first carriage for causing advancement of said first carriage one denomination,
   yieldable means for causing a second one of said carriages to follow said first carriage, and
   second escapement means adapted to restrain said second carriage upon movement of said second carriage to a predetermined position,
   said second escapement means being operable as an incident to setting of a said pin in said second carriage for causing advancement of said second carriage one denomination.

2. The combination according to claim 1 comprising means responsive to advancement of said first carriage to a predetermined position for rendering said first escapement means ineffective to restrain said first carriage.

3. The combination according to claim 1 comprising means including depressible keys, and
   means controlled by certain of said keys for rendering said first escapement means ineffective to restrain said first carriage.

4. The combination according to claim 1 wherein said escapement means comprises depressible escapement pins in denominational columns of said carriages and stops for arresting undepressed ones of said escapement pins, and
   means on said first carriage for rendering said one of said stops ineffective to arrest said escapement pins on said first carriage.

5. The combination according to claim 1 wherein said escapement means comprises depressible escapement pins in denominational columns of said carriages and stops for arresting undepressed ones of said escapement pins, and
   a blocking member on said first carriage for moving one of said stops out of arresting relation with said escapement pins on said first carriage.

6. The combination according to claim 1 comprising means on each of said carriages for supporting said elements,
   latches normally holding said elements from advancement, and
   means responsive to setting of a pin in a said column for releasing the aligned latch.

7. The combination according to claim 1 comprising means on said carriages supporting said elements for denominational movement,
   a plurality of type members having type characters thereon,
   said type members being immovable denominationally,
   means for effecting a printing impression from different ones of said type characters onto a record medium,
   means for yieldably advancing said type members to different character representing positions, and
   means on said elements for differentially arresting aligned ones of said type members.

8. The combination according to claim 6 comprising means other than said last mentioned means for concurrently releasing a plurality of said latches.

9. The combination according to claim 1 comprising a plurality of gear sectors,
   said sectors being immovable denominationally,
   a register cooperable with certain of said sectors and effective to be actuated by said last mentioned sectors,
   means for yieldably advancing said sectors to different positions, means on said elements for differentially arresting aligned ones of said sectors, latches on said carriages for normally holding aligned ones of said elements from advancement, means operable in response to setting of a said pin in either of said carriages for releasing an aligned one of said latches, and means other than said last mentioned means for concurrently releasing those said latches cooperating with those segments associated with said register.

10. In a calculating machine, the combination comprisng a plurality of denominationally arranged elements differentially movable to different character representing positions, means for yieldably advancing said elements, a pin carriage, said carriage having a plurality of denominationally arranged columns of settable pins effective to arrest aligned ones of said elements in different character representing positions, yieldable means for denominationally advancing said carriage, escapement means normally restraining said carriage and operable as an incident to setting of a said pin for causing said yieldable means to advance said carriage one denomination, control means responsive to advancement of said carriage to a predetermined position for rendering said escapement means ineffective to restrain said carriage, and means for invariably arresting said carriage in a second predetermined position.

11. The combination according to claim 10 wherein said escapement means comprises depressible escapement pins in said columns of said carriage, and a stop for arresting undepressed ones of said depressible pins;

said control means comprising an electromagnetic device for holding said stop out of cooperative relation with said depressible pins, a normally open switch in circuit with said electromagnetic means, and means on said carriage for closing said switch when said carriage reaches said first mentioned predetermined position.

References Cited
UNITED STATES PATENTS

| | | | |
|---|---|---|---|
| 3,017,081 | 1/1962 | Scozzafava et al. | 235—60 |
| 3,080,112 | 3/1963 | Busch | 235—60.31 |
| 3,319,883 | 5/1967 | Thevis | 235—60 |

RICHARD B. WILKINSON, *Primary Examiner.*

STANLEY A. WAL, *Assistant Examiner.*